UNITED STATES PATENT OFFICE.

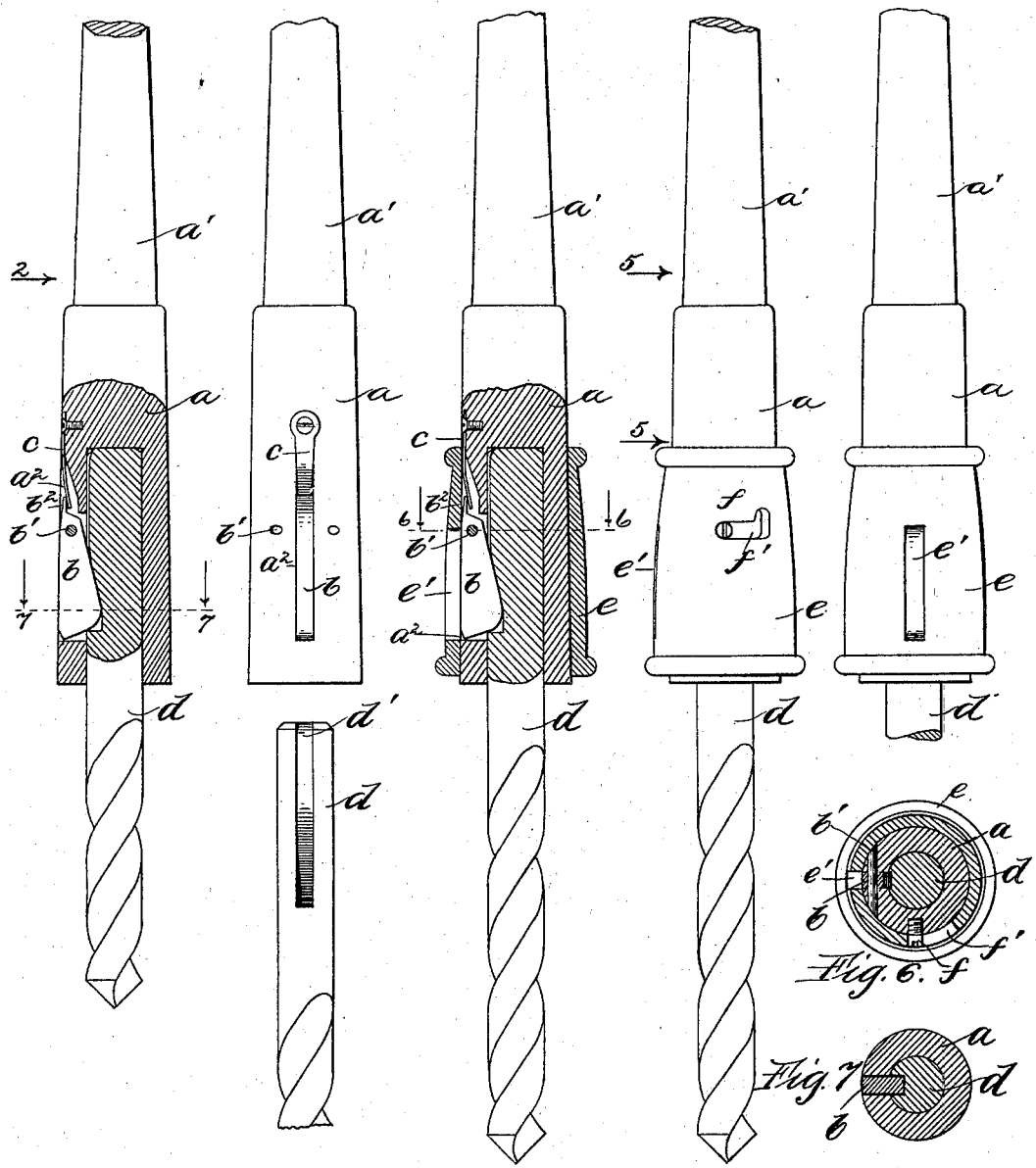

IRVING BARKER, OF SPRINGFIELD, ILLINOIS, ASSIGNOR OF ONE-HALF TO ALBERT L. IDE, OF SAME PLACE.

TOOL-CHUCK.

SPECIFICATION forming part of Letters Patent No. 591,088, dated October 5, 1897.

Application filed April 5, 1897. Serial No. 630,777. (No model.)

*To all whom it may concern:*

Be it known that I, IRVING BARKER, a citizen of the United States, residing at Springfield, in the county of Sangamon and State of Illinois, have invented a certain new and useful Improvement in Tool-Chucks, (Case No. 1,) of which the following is a full, clear, concise, and exact description, reference being had to the accompanying drawings, forming a part of this specification.

My invention relates to tool-chucks, and has for its object the provision of an improved form of tool chuck or holder wherein the objections present in devices of this class as heretofore constructed are obviated.

The device of my invention is primarily designed for engaging the shanks of drills, although it may be employed with advantage in securing other tools in place.

In the ordinary form of drill-chucks, such as are employed in connection with drill-presses in which the chuck is vertically disposed, is provided a socket in which a transverse slot is cut, this slot being adapted to receive a tang formed upon the shank of the drill. In this construction most of the strain comes upon the tang, and where heavy work is performed the tang is frequently twisted or broken and the slot in the socket of the chuck reamed or worn, so that both the tool and the chuck frequently become unfit for further use. To obviate these difficulties, a tool-chuck having a common and well-known form of tool-socket was employed, an opening being provided through the side of the socket, in which a loose locking-key was inserted, a rotatable sleeve being mounted upon the lower end of the socket and having an internal cam-surface over the key, the sleeve being confined to a fixed position with relation to the socket by means of a set-screw in the sleeve engaging a groove in the socket. The shank of the tool to be held was provided with a longitudinal groove deepening toward the base of the shank, which was engaged by the key.

My invention has for its object the simplification of the structure described; and, generally speaking, it consists, in its preferred embodiment, in the combination of a chuck having a socket for the reception of a tool, a slot being formed in said chuck, a key provided in said slot, and a sleeve surrounding said chuck, the bore of the sleeve being substantially smooth and tapering from the mouth of the socket, the portion of the chuck surrounded by the sleeve being correspondingly tapered jointly with a tool having a keyway or slot with which the key is adapted to be engaged.

My invention will be more readily understood by reference to the accompanying drawings, which illustrate the preferred embodiment thereof.

In the drawings, Figure 1 is an elevation, partially in section, of a chuck with the sleeve omitted for clearness. Fig. 2 is an elevation of the chuck shown in Fig. 1, looking in the direction of the arrow 2, the tool being removed from the chuck. Fig. 3 is an elevation, partially in section, of the complete device. Fig. 4 is a complete elevation of the device. Fig. 5 is an elevation of the chuck shown in Figs. 3 and 4, taken in the direction of the arrow 5. Fig. 6 is a sectional plan view on line 6 6 of Fig. 3. Fig. 7 is a sectional plan view on line 7 7 of Fig. 1.

Like letters are indicative of like parts throughout the different views.

Referring more particularly to Figs. 1, 2, and 7, the chuck $a$ is provided with a shank $a'$, which is engaged by a rotating element of the drill-press. The chuck has a socket in which the tool is inserted, a slot $a^2$ being provided through the side of the chuck and communicating with the socket. A key or spline $b$ is movably mounted in the slot, preferably by being supported near its upper end upon a pivot-pin $b'$. A spring $c$ is mounted upon the socket and projects within the slot $a^2$ and engages the under surface of a nose $b^2$, carried upon the upper portion of the key. The spring $c$ tends to thrust the lower end of the nose toward the socket of the chuck. The shank of the drill or tool $d$ is provided with a longitudinal keyway or slot $d'$, which deepens toward the working end of the tool, and which is curved at the upper end to guide the key into engagement with the keyway as the tool is inserted, the lower end of the key being preferably rounded, as shown, to facilitate this engagement.

I provide a sleeve $e$ whose bore preferably tapers from the bottom to the top, the body of the chuck being correspondingly tapered. By thus tapering the bore of the sleeve and the engaging portion of the chuck I am enabled to dispense with the set-screw in the sleeve and the groove in the chuck for engaging and maintaining the sleeve in place, while at the same time the sleeve may be readily lifted when access to the parts is desired.

I preferably provide a slot $e'$ in the sleeve, which may be registered with the slot $a^2$ when it is desired to remove or insert a tool, the key being pushed within the slot $e'$ as the tool is inserted or withdrawn. When the tool is inserted, the sleeve is rotated to move the slot therein from alinement with slot $a^2$, so that the tool cannot be withdrawn, since when the sleeve is in this position the key is firmly held between the tool and the sleeve.

In order that the sleeve may be properly limited in its range of rotary travel, I mount a stop-screw $f$ in the chuck, which engages an angular grooveway $f'$, formed in the sleeve, the grooveway and stop-screw constituting a bayonet-catch. When the screw $f$ and slot $f'$ occupy the position shown in Fig. 4, the slots $e'$ and $a^2$ are in alinement, in which position the tool may be readily withdrawn from or inserted within the chuck-socket. When the tool is to be firmly secured in place, the sleeve is rotated and lowered to bring the vertical portion of the slot into engagement with the pin, whereby the sleeve is prevented from being accidentally rotated.

The stop-screw and slot $f'$ are not absolutely essential, since the bore of the tapered sleeve is evenly engaged with all portions of the body of the chuck which it incloses.

In the claims I use the term "substantially smooth" as applied to the bore of the sleeve in the sense that the bore lacks threads by which it is engaged with the chuck.

I do not wish to be limited to the precise construction or application of my invention herein shown and described, as the construction illustrated might be modified without departing from my invention and as other uses of my improved device may readily suggest themselves to the mechanic; but,

Having thus described my invention, what I claim as new, and desire to secure by Letters Patent, is—

1. The combination of a chuck having a socket for the reception of a tool, a slot being formed in said chuck, a key or spline pivoted in said chuck, and a rotatable sleeve surrounding said chuck which is provided with a slot adapted to register with the slot in the chuck; jointly with a tool having a longitudinal keyway or slot with which the key is adapted to be engaged, substantially as described.

2. The combination of a tool having a keyway formed in the shank thereof; jointly with a tool-chuck provided with a socket for the reception of the shank of the tool, said chuck having a slot $a^2$ communicating with the socket, a key or spline provided within said slot, a rotatable sleeve surrounding said chuck and provided with a slot adapted to register with the key, and a spring $c$ engaging said key and tending to thrust the same within the socket and into engagement with the keyway upon the shank of the tool, substantially as described.

3. The combination of a chuck having a socket for the reception of a tool, a slot being formed in said chuck, a key provided in said slot, and a sleeve surrounding said chuck, the bore of the sleeve being substantially smooth and tapering from the mouth of the socket, the portion of the chuck surrounded by the sleeve being correspondingly tapered; jointly with a tool having a keyway or slot with which the key is adapted to be engaged, substantially as described.

In witness whereof I have hereunto subscribed my name this 29th day of March, A. D. 1897.

IRVING BARKER.

Witnesses:
  W. L. GROSS,
  TIMOTHY MCGRATH.